(12) United States Patent
Ford et al.

(10) Patent No.: US 7,809,989 B2
(45) Date of Patent: Oct. 5, 2010

(54) PERFORMING DIAGNOSTIC OPERATIONS UPON AN ASYMMETRIC MULTIPROCESSOR APPARATUS

(75) Inventors: Simon Andrew Ford, Cambridge (GB); Alastair David Reid, Fulbourn (GB); Katherine Elizabeth Kneebone, Cambridge (GB); Edmund Grimley-Evans, Cambridge (GB)

(73) Assignee: ARM Limited, Cambridge (GB)

( * ) Notice: Subject to any disclaimer, the term of this patent is extended or adjusted under 35 U.S.C. 154(b) by 462 days.

(21) Appl. No.: 11/907,881

(22) Filed: Oct. 18, 2007

(65) Prior Publication Data

US 2008/0098262 A1  Apr. 24, 2008

Related U.S. Application Data

(60) Provisional application No. 60/853,756, filed on Oct. 24, 2006.

(30) Foreign Application Priority Data

May 11, 2007  (GB) .................. 0709182.0

(51) Int. Cl.
*G06F 11/00* (2006.01)
(52) U.S. Cl. ...................................... 714/38
(58) Field of Classification Search .................. 714/38; 717/128, 131
See application file for complete search history.

(56) References Cited

U.S. PATENT DOCUMENTS

| | | | | |
|---|---|---|---|---|
| 5,692,193 A * | 11/1997 | Jagannathan et al. | ........ | 718/106 |
| 6,115,763 A * | 9/2000 | Douskey et al. | ............... | 710/72 |
| 6,539,339 B1 * | 3/2003 | Berry et al. | ................. | 702/186 |
| 6,748,583 B2 * | 6/2004 | Aizenbud-Reshef et al. | | 717/127 |
| 6,857,084 B1 * | 2/2005 | Giles | ........................... | 714/35 |
| 6,862,694 B1 * | 3/2005 | Tormey et al. | ................ | 714/34 |
| 6,941,492 B1 * | 9/2005 | Ezra et al. | ..................... | 714/38 |

(Continued)

FOREIGN PATENT DOCUMENTS

EP  0 396 833  11/1990

(Continued)

OTHER PUBLICATIONS

J. Engblom, "Debugging real-time multiprocessor systems: Part 2, Debugging Parallel Programs" embedded.com Mar. 2006, pp. 1-5.

(Continued)

*Primary Examiner*—Joshua A Lohn
(74) *Attorney, Agent, or Firm*—Nixon & Vanderhye P.C.

(57) ABSTRACT

An asymmetric multiprocessor apparatus 2 is provided in which respective slave diagnostic units 20, 22, 24 are associated with corresponding execution mechanisms 6, 8, 10. A master diagnostic unit 26 tracks the migration of thread execution between the different execution mechanisms 6, 8, 10 so that the execution of a given thread can be followed by the diagnostic mechanisms 20, 22, 24, 26 and this information provided to the programmer. The execution mechanisms 6, 8, 10 can be diverse such as a general purpose processor 6, a DMA unit 12, a coprocessor, an VLIW processor, a digital signal processor 8 and a hardware accelerator 10. The asymmetric multiprocessor apparatus 2 will also typically include an asymmetric memory hierarchy such as including two or more of a global memory, a shared memory 16, a private memory 18 and a cache memory 14.

33 Claims, 4 Drawing Sheets

U.S. PATENT DOCUMENTS

| | | | |
|---|---|---|---|
| 7,080,283 B1* | 7/2006 | Songer et al. | 714/30 |
| 7,243,264 B2* | 7/2007 | Weber et al. | 714/25 |
| 7,444,546 B2* | 10/2008 | Kimelman et al. | 714/31 |
| 2002/0065864 A1* | 5/2002 | Hartsell et al. | 709/100 |
| 2003/0115495 A1* | 6/2003 | Rawson, III | 713/324 |
| 2004/0154027 A1* | 8/2004 | Vandewalle et al. | 719/330 |
| 2005/0034024 A1* | 2/2005 | Alverson et al. | 714/38 |
| 2006/0282707 A1* | 12/2006 | Rosenbluth et al. | 714/38 |
| 2007/0016733 A1* | 1/2007 | Day et al. | 711/152 |
| 2007/0067771 A1* | 3/2007 | Kulbak et al. | 718/100 |
| 2007/0250820 A1* | 10/2007 | Edwards et al. | 717/131 |
| 2008/0108899 A1* | 5/2008 | Halmann et al. | 600/459 |
| 2009/0313507 A1* | 12/2009 | Swaine et al. | 714/38 |

FOREIGN PATENT DOCUMENTS

| | | |
|---|---|---|
| WO | 2006/028520 | 3/2006 |

OTHER PUBLICATIONS

J. Engblom, "Debugging Real-Time Multiprocessor Systems" Class #264, Embedded Systems Conference, 2006, pp. 1-15.

QNX Software Systems GmbH & Co. KG, "QNX Neutrino RTOS—System Architecture" Feb. 2006, pp. 1-407.

* cited by examiner

PERFORMING DIAGNOSTIC OPERATIONS UPON AN ASYMMETRIC MULTIPROCESSOR APPARATUS

This application claims priority from Great Britain Patent Application No. 0709182.0, filed 11 May 2007, which claims priority to U.S. Provisional Application No. 60/853,756, filed 24 Oct. 2006. The entire contents of each of which are hereby incorporated by reference.

BACKGROUND OF THE INVENTION

1. Field of the Invention

This invention relates to data processing systems. More particularly, this invention relates to the provision of diagnostic mechanisms for use with asymmetric multiprocessor apparatus.

2. Description of the Prior Art

Diagnostic mechanisms, such as debug mechanisms, trace mechanisms and profiling mechanisms, are increasingly significant in the field of data processing system development. As data processing systems become more complex, and the time for their development and testing becomes shorter, there is an increasing need for powerful and easy-to-use diagnostic mechanisms that can be used to identify problems associated with data processing systems and improve the performance of those data processing systems by adjusting their design and configuration.

Another trend within data processing systems is the increasing use of multiprocessor systems. These are used to deliver higher performance by permitting processing to be performed in parallel, typically by different threads of a program or task. One form of such multiprocessor systems is known as a symmetric multiprocessor system. Such symmetric systems typically include a plurality of identical processor cores each having an identical coherent view of program and data memory and operating system software is responsible for allocating the tasks/threads to be performed to the individual processors and for migrating a task/thread between processors. That is, a single thread of program instruction execution is time-multiplexed between a plurality of processors under operating system control. Within such symmetric systems the operating system can be used to determine where individual tasks/threads are being executed and provide a programmer with the appearance of a single thread executing on a single processor even when the operating system scheduling migrates execution from one processor to another processor. Such an approach is limited to processors which are identical and where migration is performed by the operating system, i.e. without being triggered by the program itself.

Whilst symmetric multiprocessor systems can improve processing performance, they are inefficient to some degree. As an example, if the processing to be performed requires some operations which would best be performed by a DSP type core (e.g. highly numerically intensive and repetitive) and other tasks better performed by a general purpose processor (e.g. flow control, user input etc), then a symmetric multiprocessor is a relatively inefficient way of implementing such processing. This has been recognised and it is known to provide asymmetric multiprocessing (AMP) systems. An example of such a system would be the OMAP platform designed by Texas Instruments. Within such platforms multiple different processors are provided with each of these having characteristics making it better suited to some tasks over others. As an example, an asymmetric multiprocessor may include a DSP core as well as a general purpose microprocessor core. Whilst such asymmetric multiprocessors have strong advantages in terms of the processing performance they can deliver with relatively low cost and low power consumption, they are more difficult to program and develop due to their heterogeneous nature. In order to make good use of such asymmetric multiprocessor systems, it is normal for the migration of tasks between threads to be performed by the program itself rather than under control of an operating system. Furthermore, the different processing architectures of the different processors mean that significantly different diagnostic mechanisms may be appropriate to each of the processors. Synchronous remote procedure calls in AMP systems can be viewed as program controlled migration of threads from one processor to the other in analogy to operating system controlled migration of threads in SMP systems but this simple view of the system is not supported by existing diagnostic mechanisms which partition the system according to which processor performs the operations. This has the result that the relatively simple diagnostic techniques associated with symmetric multiprocessing systems cannot readily be used with asymmetric multiprocessor systems even though the complexity and difficulty of programming such asymmetric processing systems mean that diagnostic mechanisms are even more important. In a traditional AMP system, code running on each processor is treated separately. The code for each processor is debugged as if it were a separate program which communicates with separate programs on other processors.

SUMMARY OF THE INVENTION

Viewed from one aspect the present invention provides an asymmetric multiprocessor apparatus comprising:

a plurality of execution mechanisms responsive to respective program instructions to perform data processing operations, a thread of program instruction execution being time-multiplexed between said plurality of execution mechanisms;

a plurality of slave diagnostic units each associated with a respective execution mechanism to perform diagnostic operations thereupon;

a master diagnostic unit coupled to said plurality of slave diagnostic units and responsive to a migration of execution of a given thread between execution mechanisms to make a corresponding change in which of said slave diagnostic units is currently active to perform diagnostic operations in respect of said given thread such that said master diagnostic tracks changes in which execution mechanism is executing said given thread.

The present technique provides a structure in which the respective execution mechanisms within the asymmetric multiprocessor are provided with their own slave diagnostic units. These slave diagnostic units are coupled to a master diagnostic unit which has the responsibility for tracking the migration of threads between execution units and thereby enable the provision of a single view of the execution of a given thread even when this is split across different execution mechanisms within the asymmetric multiprocessor system. This significantly eases the task of identifying and understanding problems which arise with the programming configuration since individual threads of execution may be tracked across such a heterogeneous environment, e.g. code split across processors in an AMP system can be debugged as a single entity.

The complexity and difficulty in understanding the operation of such an asymmetric multiprocessor systems are compounded, and accordingly the advantages of the present technique enhanced, in systems comprising an asymmetric memory hierarchy such that the plurality of execution mechanisms do not share a common memory map. Within systems having such an asymmetric memory hierarchy, the complexity of the different memory maps used by the different execution mechanisms makes using individual diagnostic units associated with individual execution mechanisms more difficult for a programmer to understand as the same data item may be referenced in different ways by the different execution mechanisms. The master diagnostic unit of the present technique which is able to track thread changes is able to take account of these memory mapped differences on behalf of the programmer thereby significantly easing the programmer's task.

Whilst an asymmetric multiprocessor may be asymmetric by virtue of having an asymmetric memory hierarchy, it may also be asymmetric by virtue of at least some of the execution mechanisms differing in their processing architecture. This is commonly the case such that different processors can be targeted at different types of task and the present techniques are useful in assisting the programmer in dealing with such complexity.

As mentioned above, the present technique is able to cope with systems in which it is the program itself which controls migration of tasks between execution mechanisms. A particularly efficient way of achieving this, which would be difficult to deal with from a diagnostic sense without the present technique, is one in which a synchronous remote procedure call from one execution mechanism to another execution mechanisms initiates migration of execution of a thread. In this case the migration is being performed explicitly by the program and the remote procedure calls may be performed by one of a pool of routines which can execute on the callee execution mechanisms and target different destination execution mechanisms.

The usability of the present technique is enhanced when the master diagnostic unit provides a diagnostic output from execution of a given thread by an execution mechanism and is responsive to a change in the execution mechanism for that thread to make a corresponding change in the diagnostic output such that the programmer can recognise that a migration of execution mechanism has occurred. It is often be the case that problems with a program are associated with migration and accordingly this information is useful to the programmer.

The slave diagnostic units associated with the different execution mechanisms may require programming to perform diagnostic operations upon particular threads of execution. The master diagnostic unit, which has tracked the threads as they are executed by different execution mechanisms, is able to direct the diagnostic commands in respect of a given thread to the slave diagnostic unit associated with that given thread at the relevant time.

The diagnostic units could take a wide variety of different forms. For example, they may be breakpoint units, watchpoint units, trace units and/or profiling units. These diagnostic units can be provided by pure hardware, a mixture of hardware and software or pure software. Some diagnostic units are better suited for implementation in hardware, such as tracing units which require particularly high bandwidth in order to trace the real time operation of processors.

It will be appreciated that the execution mechanisms can take a wide variety of different forms as discussed above. For example, the execution mechanisms can include one or more of a general purpose processor, a direct memory access unit, a coprocessor, a VLIW processor, a digital signal processor and/or a hardware accelerator unit. These various forms of execution mechanism other than the general purpose processor can be considered as a variety of different forms of special purpose processor.

The asymmetric memory hierarchy discussed above can similarly be formed in a variety of different ways. The memories provided may be cache memories, private memories, shared memories or global memories. These will be mixed together in an asymmetric form, which may be efficient for the ultimate implementation and use of the asymmetric multiprocessor apparatus, but which provides an increased level of difficulty in performing diagnostic operations upon the system. It will be appreciated that a parallel system typically contains multiple threads each of which may be time-multiplexed across the plurality of execution mechanisms.

Viewed from another aspect the present invention provides a method of performing diagnostic operations upon an asymmetric multiprocessor apparatus, said method comprising the steps of:

in response to respective program instructions performing data processing operations with a plurality of execution mechanisms, a thread of program instruction execution being time-multiplexed between said plurality of execution mechanisms;

performing diagnostic operations upon said plurality of execution mechanisms with respective slave diagnostic units associated therewith;

using a master diagnostic unit coupled to said plurality of slave diagnostic units and responsive to a migration of execution of a given thread between execution mechanisms to make a corresponding change in which of said slave diagnostic units is currently active to perform diagnostic operations in respect of said given thread such that said master diagnostic tracks changes in which execution mechanism is executing said given thread.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
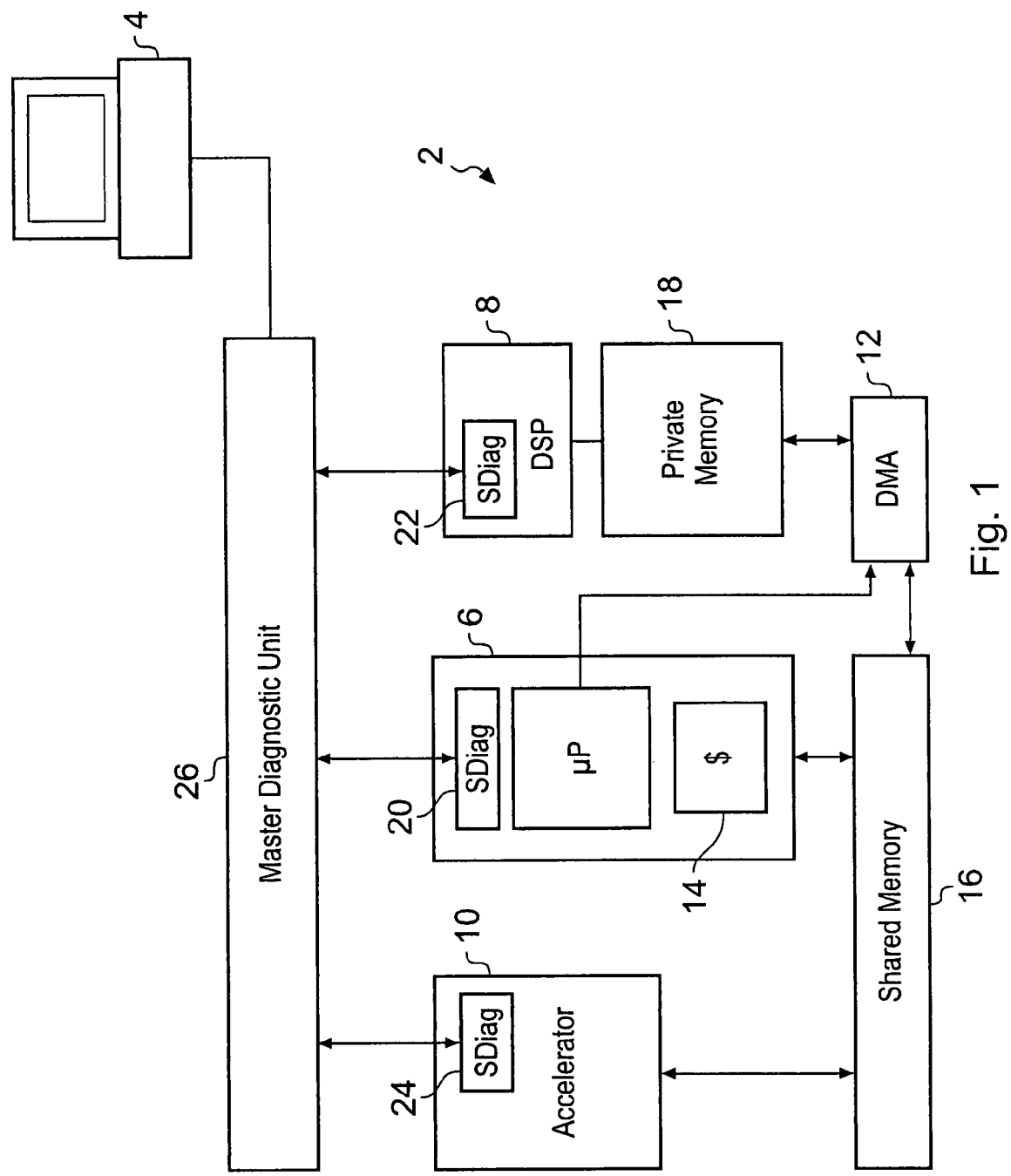
FIG. 1 schematically illustrates an asymmetric multiprocessor apparatus in accordance with one example of the present technique.

FIG. 1 schematically illustrates an asymmetric multiprocessor apparatus 2 connected to a general purpose computer 4. The general purpose computer is used to program and control diagnostic operations. The asymmetric multiprocessor apparatus 2 comprises a plurality of execution mechanisms in the form of a general purpose processor 6, a digital signal processor 8, an accelerator 10 and a direct memory access (DMA) unit 12. It will be appreciated that different combinations of execution mechanisms may be provided within asymmetric multiprocessor apparatus, such as an VLIW processor and/or a coprocessor. Furthermore, such an asymmetric multiprocessor apparatus may include multiple execution mechanisms of a given type, which may be identical, as well as one or more execution mechanisms of a different type, e.g. a single general purpose processor with multiple DSP units.

The asymmetric multiprocessor apparatus 2 of FIG. 1 has an asymmetric memory hierarchy comprising a cache memory 14, which is local to the general purpose processor 6, a shared memory 16 which is accessible to the accelerator 10, the general purpose processor 6 and the DMA unit 12 and a private memory 18. The private memory 18 is accessible only to the DSP unit 8 and the DMA unit 12. The DMA unit 12 is controlled by the general purpose processor 6, which sets up DMA operations to be performed by the DMA unit 12. These will typically include transferring data between the private memory 18 and the shared memory 16. It will be appreciated that with such an arrangement a block of input data may be transferred from the shared memory 16 under control of the general purpose processor 6 into the private memory 18 where it can be subject to intensive numeric processing by the DSP unit 8 before the results of that processing are recovered from the private memory 18 into the shared memory 16 by the general purpose processor 6. The processing being performed by the DSP unit 8 is part of the same program thread, which is also at least partially running on the general purpose processor 6, and when the point within that thread is reached at which processing by the DSP unit 8 is required, then a synchronous remote procedure call is made from the general purpose processor 6 to the DSP unit 8 to initiate processing upon the DSP unit 8. At the end of the processing by the DSP unit 8, a further synchronous remote procedure call is made to elsewhere or a simple return from the remote procedure call can be made.

As will be seen in FIG. 1, each of the execution mechanisms 6, 8 and 10 include respective slave diagnostic unit 20, 22 and 24. The DMA unit 12, as this operates only under control of the general purpose processor 6, does not have its own slave diagnostic unit. It will be appreciated that the different processor architectures provided by the different execution mechanisms 6, 8, 10, will mean that the slave diagnostic units 20, 22 and 24 have different forms and capabilities, as well as requiring different types of programming, and produce different forms of output. This diversity across an asymmetric multiprocessor apparatus 2 is what conventionally presents difficulty to a programmer trying to understand the execution of a given thread which migrates between different execution mechanisms 6, 8, 10.

In addition to the plurality of slave diagnostic units 20, 22, 24, there is provided a master diagnostic unit 26 which is coupled to each of the slave diagnostic units 20, 22, 24. The master diagnostic unit, via the slave diagnostic units 20, 22, 24, serves to monitor program thread migration, such as by identifying synchronous remote procedure calls and returns. The master diagnostic unit 26 is connected to a general purpose computer 4 which is used to program diagnostic operations to be performed and monitor the diagnostic output and display the diagnostic output to a programmer. The master diagnostic unit 26 can be provided as a hardware component, as a mixed hardware and software component, or as a pure software component executing upon the general purpose computer 4.

The slave diagnostic units 20, 22 and 24 are illustrated as being provided within each of their respective execution mechanisms 6, 8, 10, but it will be appreciated that the slave diagnostic units 20, 22, 24 could be separately provided outside of the execution mechanisms 6, 8, 10 concerned. A slave diagnostic unit can be shared between multiple execution mechanisms, e.g. a tracing unit which is monitoring data being written to or read from the shared memory 16 will perform tracing in respect of more than one of the execution mechanisms 6, 8, 10. Nevertheless, such a tracing unit would be associated with at least one of the execution mechanisms in that it performed tracing in respect of at least one of the execution mechanisms.

Figure 2:
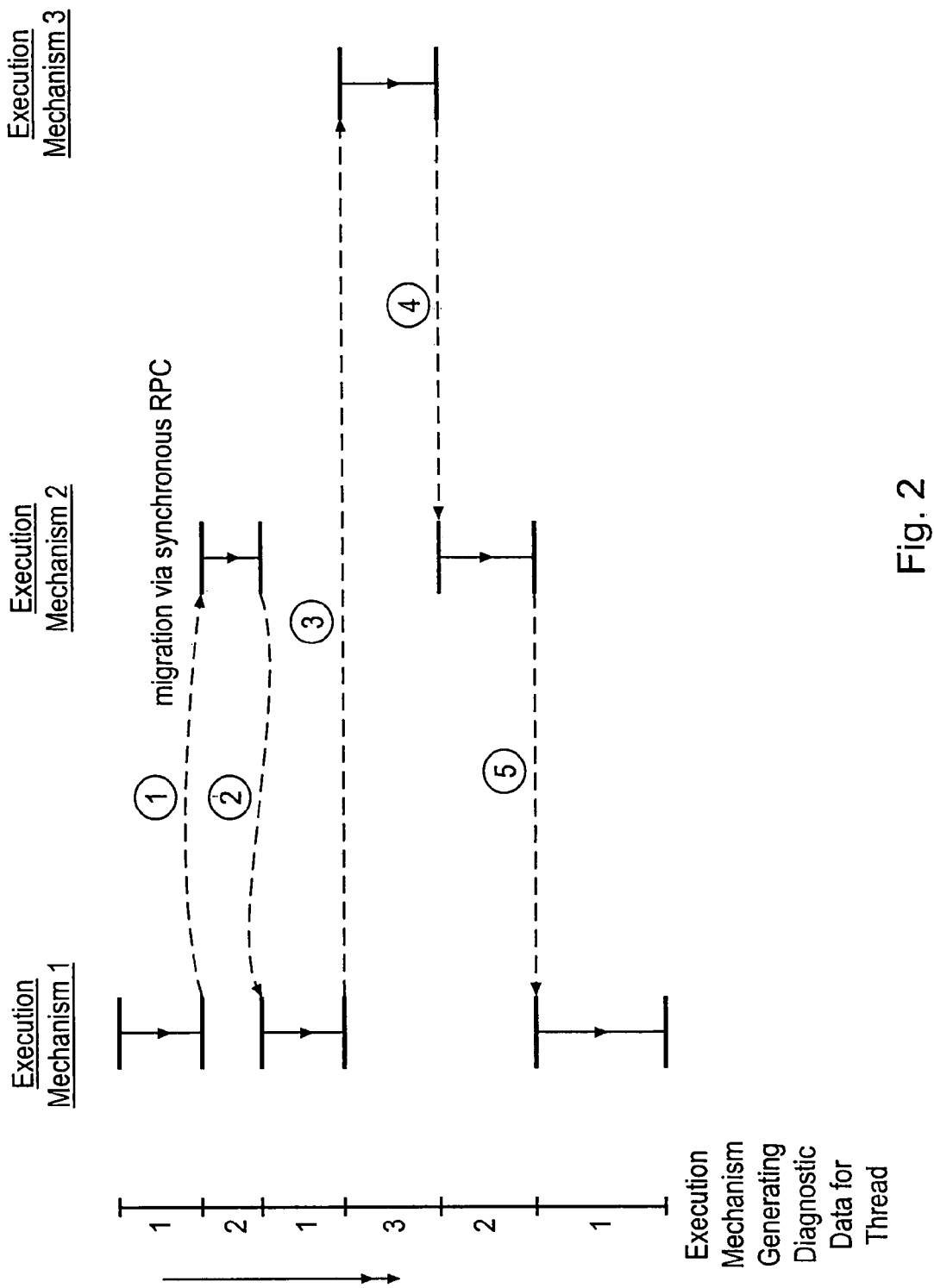
FIG. 2 schematically illustrates the migration of execution of a given thread within a program between different execution mechanisms and the tracking of such migration by the master diagnostic unit.

FIG. 2 is a diagram schematically illustrating the migration of a given thread of program execution between different execution mechanisms. In this illustration, there are three different execution mechanisms. These may be considered to correspond to the general purpose processor 6, the DSP unit 8 and the accelerator 10 of FIG. 1, although other mappings to different execution mechanisms would equally be possible. As illustrated, the program thread starts execution upon execution mechanism 1 and then is subject to migration via a synchronous remote procedure call to execution mechanism 2. After executing upon execution mechanism 2 for a period of time a return is made to execution mechanism 1. Subsequent migrations are made to execution mechanisms 2 and 3 as illustrated. During all of this period, the master diagnostic unit 26 monitors the occurrence of synchronous remote procedure calls switching the execution of the program thread between the different execution mechanisms and accordingly tracks which execution mechanism is currently active in processing the program thread. This is the tracking information illustrated at the lefthand side of FIG. 2. This tracking information is used by the master diagnostic unit 26 to channel the diagnostic information recovered from the different slave diagnostic units 20, 22, 24 to be displayed in association with the appropriate program thread when this is displayed and subject to interaction by the programmer upon the general purpose computer 4. The diagnostic information display includes the identification of the currently active execution mechanism for the point in the program concerned. As an example, if whilst a thread is executing on execution mechanisms 2 the programmer wishes to halt that thread, then the halt command will be directed to execution mechanism 2 as the master diagnostic unit 26 determines that it is execution mechanism 2 which is currently active in processing the thread.

Figure 3:
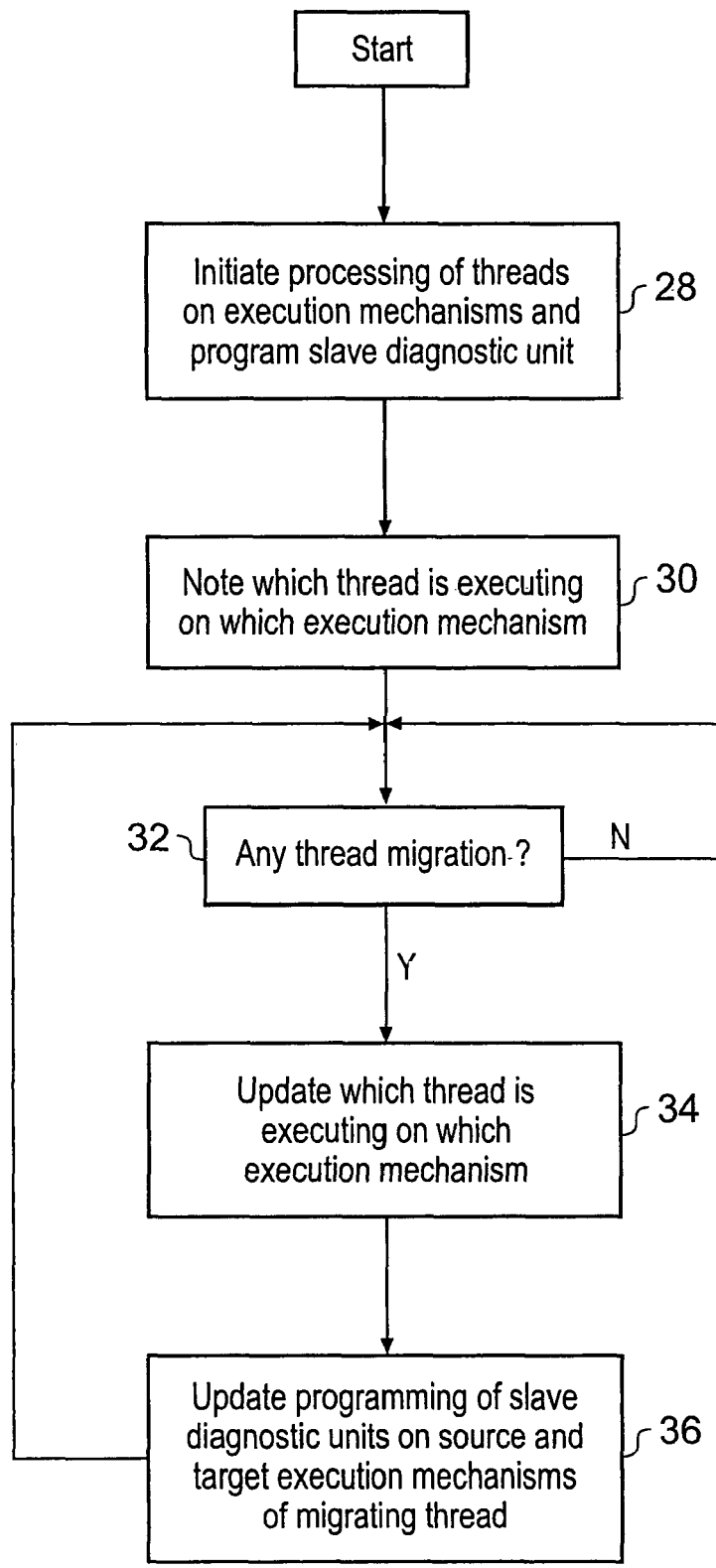
FIG. 3 is a flow diagram schematically illustrating the initiation of diagnostic operations and the tracking of thread migration.

FIG. 3 is a flow diagram schematically illustrating the type of thread tracking which is performed by the master diagnostic unit 26. At step 28 processing of the different threads on the execution mechanisms 6, 8, 10 is initiated and the associated slave diagnostic units 20, 22, 24 are programmed with their diagnostic parameters (e.g. breakpoints, watchpoints, profiling parameters, trace parameters etc). At step 30, the master diagnostic unit 26 identifies which threads are executing on which execution mechanisms and this data is collected and held by the master diagnostic unit 26, such as within a thread data table. It will be appreciated that which execution mechanism executes which particular thread may not be predetermined by the program itself as it may be heuristically determined at runtime depending upon loading and other factors.

At step 32, the master diagnostic unit 26 monitors to check whether any thread migration has taken place, such as by virtue of a issue of synchronous remote procedure call. When thread migration is detected, then processing proceeds to step 34 at which the data indicating which thread is executing on which execution mechanism is updated to take account of the caller no longer executing a thread and the callee now executing that thread.

At step 36 the programming of the slave diagnostic units 20, 22 and 24 is altered (if needed) to take account of the migration which has occurred. For example, if the caller execution unit was monitoring for a particular breakpoint or watchpoint in respect of the thread, then when that execution mechanism is no longer executing that thread, then it would be inappropriate to continue to monitor for those breakpoints and watchpoints as this could give false results due to aliasing of those breakpoints or watchpoints with the execution occurring in response to a different program thread. After any necessary reprogramming of the slave diagnostic units at step 36, processing is returned to step 32 where monitoring for further thread migration can be performed.

Figure 4:
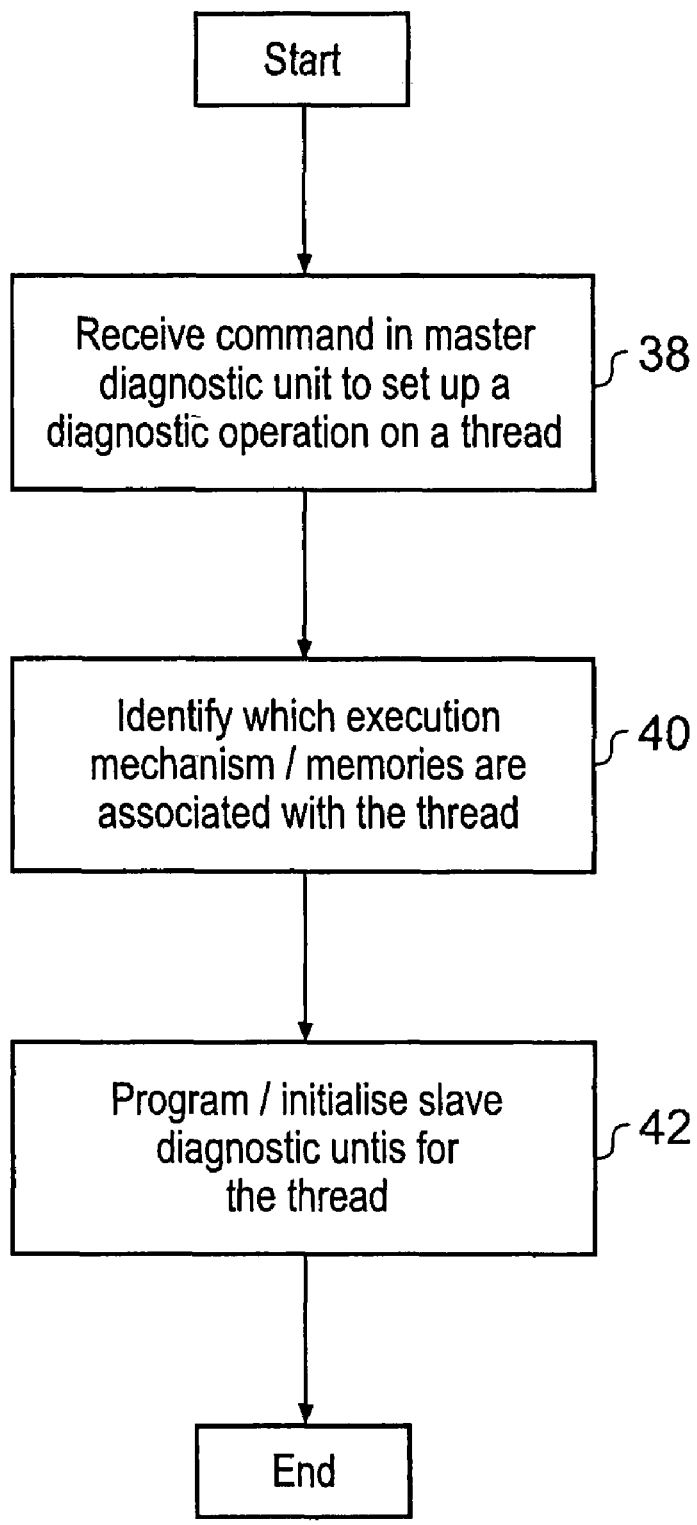
FIG. 4 is a flow diagram schematically illustrating the initial programming of the diagnostic mechanisms of the present technique in accordance with one example embodiment.

FIG. 4 schematically illustrates the setup of the diagnostic operations within the system of FIG. 1. At step 38, a programmer using the general purpose computer 4 instructs a given diagnostic command to be performed and this command is sent to the master diagnostic unit 26 where it is received at step 38. Step 40 corresponds to the master diagnostic unit 26 determining which execution mechanism (or memory in the case of a watchpoint) is associated with the thread in respect of which the diagnostic command is to be performed. Step 42 then programs/initialises the relevant slave diagnostic unit for the thread in respect of the command which has been received.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An asymmetric multiprocessor apparatus comprising:
a plurality of execution mechanisms responsive to respective program instructions to perform data processing operations, a thread of program instruction execution being time-multiplexed between said plurality of execution mechanisms;
a plurality of slave diagnostic units each associated with a respective execution mechanism to perform diagnostic operations thereupon;
a master diagnostic unit coupled to said plurality of slave diagnostic units and responsive to a migration of execution of a given thread between execution mechanisms to make a corresponding change in which of said slave diagnostic units is currently active to perform diagnostic operations in respect of said given thread such that said master diagnostic tracks changes in which execution mechanism is executing said given thread.

2. An asymmetric multiprocessor apparatus as claimed in claim 1, comprising an asymmetric memory hierarchy such that said plurality of execution mechanisms do not share a common memory map.

3. An asymmetric multiprocessor apparatus as claimed in claim 1, wherein at least one of said plurality of execution mechanisms has a different processing architecture than one or more other of said plurality of execution mechanisms.

4. An asymmetric multiprocessor apparatus as claimed in claim 1, wherein said migration of execution is by a synchronous remote procedure call from one execution mechanism to another execution mechanism.

5. A method as claimed in claim 4, wherein said asymmetric memory hierarchy comprises two or more of:
a global shared memory accessible to all of said execution mechanisms;
a shared memory accessible to at least two of said execution mechanisms; and
a private memory accessible to one of said execution mechanisms.

6. An asymmetric multiprocessor apparatus as claimed in claim 1, wherein said master diagnostic unit provides diagnostic output from an execution mechanism and is responsive to a change in execution mechanism for said given thread to make a corresponding change in said diagnostic output.

7. An asymmetric multiprocessor apparatus as claimed in claim 1, wherein said master diagnostic unit directs diagnostic commands in respect of said given thread to a slave diagnostic unit associated with an execution mechanism, currently executing said given thread.

8. An asymmetric multiprocessor apparatus as claimed in claim 1, wherein said master diagnostic unit sets a breakpoint in respect of a portion of said given thread upon each of those execution mechanisms upon which said portion can be executed.

9. An asymmetric multiprocessor apparatus as claimed in claim 8, wherein said breakpoint is set with a memory address matched with a memory address used for said portion by respective execution mechanisms.

10. An asymmetric multiprocessor apparatus as claimed in claim 8, wherein when said breakpoint is triggered, said master diagnostic unit determines which thread has triggered said breakpoint.

11. An asymmetric multiprocessor apparatus as claimed in claim 1, comprising a plurality of memories and wherein said master diagnostic unit sets a watchpoint for a data item in respect of each of said plurality of memories that can store said data item.

12. An asymmetric multiprocessor apparatus as claimed in claim 11, wherein said watchpoint is set with a memory address matched with a memory address used for said data item within respective memories.

13. An asymmetric multiprocessor apparatus as claimed in claim 11, wherein when said watchpoint is triggered, said master diagnostic unit determines which thread has triggered said watchpoint.

14. An asymmetric multiprocessor apparatus as claimed in claim 1, wherein said slave diagnostic units are slave tracing units, said master diagnostic unit is a master tracing unit and said master tracing unit tracks migration of execution of said given thread between different execution mechanisms when forming a trace output for said given thread.

15. An asymmetric multiprocessor apparatus as claimed in claim 1, wherein said slave diagnostic units are slave profiling units, said master diagnostic unit is a master profiling unit and said master profiling unit tracks migration of execution of said given thread between different execution mechanisms when forming a profiling output for said given thread.

16. A method as claimed in claim 1, wherein said plurality of execution mechanisms include one or more of:
a general purpose processor;
a direct memory access unit;
a coprocessor;
an VLIW processor;
a digital signal processor; and
a hardware accelerator unit.

17. A method of performing diagnostic operations upon an asymmetric multiprocessor apparatus, said method comprising the steps of:
in response to respective program instructions performing data processing operations with a plurality of execution mechanisms, a thread of program instruction execution being time-multiplexed between said plurality of execution mechanisms;

performing diagnostic operations upon said plurality of execution mechanisms with respective slave diagnostic units associated therewith;

using a master diagnostic unit coupled to said plurality of slave diagnostic units and responsive to a migration of execution of a given thread between execution mechanisms to make a corresponding change in which of said slave diagnostic units is currently active to perform diagnostic operations in respect of said given thread such that said master diagnostic tracks changes in which execution mechanism is executing said given thread.

18. A method as claimed in claim 17, wherein said asymmetric multiprocessing apparatus comprises an asymmetric memory hierarchy such that said plurality of execution mechanisms do not share a common memory map.

19. A method as claimed in claim 17, wherein at least one of said plurality of execution mechanisms has a different processing architecture than one or more other of said plurality of execution mechanisms.

20. A method as claimed in claim 17, wherein said migration of execution is by a synchronous remote procedure call from one execution mechanism to another execution mechanism.

21. A method as claimed in claim 20, wherein said asymmetric memory hierarchy comprises two or more of:
a global shared memory accessible to all of said execution mechanisms;
a shared memory accessible to at least two of said execution mechanisms; and
a private memory accessible to one of said execution mechanisms.

22. A method as claimed in claim 17, wherein said master diagnostic unit provides diagnostic output from an execution mechanism and is responsive to a change in execution mechanism for said given thread to make a corresponding change in said diagnostic output.

23. A method as claimed in claim 17, wherein said master diagnostic unit directs diagnostic commands in respect of said given thread to a slave diagnostic unit associated with an execution mechanism, currently executing said given thread.

24. A method as claimed in claim 17, wherein said master diagnostic unit sets a breakpoint in respect of a portion of said given thread upon each of those execution mechanisms upon which said portion can be executed.

25. A method as claimed in claim 24, wherein said breakpoint is set with a memory address matched with a memory address used for said portion by respective execution mechanisms.

26. A method as claimed in claim 24, wherein when said breakpoint is triggered, said master diagnostic unit determines which thread has triggered said breakpoint.

27. A method as claimed in claim 17, wherein said asymmetric multiprocessing apparatus comprises a plurality of memories and said master diagnostic unit sets a watchpoint for a data item in respect of each of said plurality of memories that can store said data item.

28. A method as claimed in claim 27, wherein said watchpoint is set with a memory address matched with a memory address used for said data item within respective memories.

29. A method as claimed in claim 27, wherein when said watchpoint is triggered, said master diagnostic unit determines which thread has triggered said watchpoint.

30. A method as claimed in claim 17, wherein said slave diagnostic units are slave tracing units, said master diagnostic unit is a master tracing unit and said master tracing unit tracks migration of execution of said given thread between different execution mechanisms when forming a trace output for said given thread.

31. A method as claimed in claim 17, wherein said slave diagnostic units are slave profiling units, said master diagnostic unit is a master profiling unit and said master profiling unit tracks migration of execution of said given thread between different execution mechanisms when forming a profiling output for said given thread.

32. A method as claimed in claim 17, wherein said plurality of execution mechanisms include one or more of:
a general purpose processor;
a direct memory access unit;
a coprocessor;
an VLIW processor;
a digital signal processor; and
a hardware accelerator unit.

33. A computer program product carrying a computer program for controlling a computer to control a master diagnostic unit and a plurality of slave diagnostic units in accordance with a method as claimed in claim 17.

* * * * *